US011607064B2

(12) United States Patent
Lee et al.

(10) Patent No.: US 11,607,064 B2
(45) Date of Patent: Mar. 21, 2023

(54) REUSABLE DRINKING STRAW

(71) Applicant: Dart Industries Inc., Orlando, FL (US)

(72) Inventors: Hsiao Fong Lee, Singapore (SG); Iwan Soetomo Salim, Singapore (SG); Olivier B. Perrin, Saint Pierre des Corps (FR); Richard Lenne, Victoria (AU); Stijn Van Damme, Zemst (BE)

(73) Assignee: Dart Industries Inc., Orlando, FL (US)

( * ) Notice: Subject to any disclaimer, the term of this patent is extended or adjusted under 35 U.S.C. 154(b) by 687 days.

(21) Appl. No.: 16/532,569

(22) Filed: Aug. 6, 2019

(65) Prior Publication Data

US 2021/0037998 A1 Feb. 11, 2021

(51) Int. Cl.
*A47G 21/18* (2006.01)
*B29C 45/26* (2006.01)
*B29L 23/00* (2006.01)

(52) U.S. Cl.
CPC ............ *A47G 21/18* (2013.01); *B29C 45/261* (2013.01); *B29L 2023/008* (2013.01)

(58) Field of Classification Search
CPC .......... A47G 21/18–185; B29C 45/261; B29L 2023/18
See application file for complete search history.

(56) References Cited

U.S. PATENT DOCUMENTS

| | | |
|---|---|---|
| 1,236,029 A | 8/1917 | Williams |
| 5,569,219 A | 10/1996 | Hakki et al. |
| 5,788,680 A | 8/1998 | Linder |
| 2004/0195347 A1* | 10/2004 | Kim ..................... A47G 21/185 239/33 |
| 2006/0065757 A1 | 3/2006 | Calabrese |
| 2009/0239015 A1 | 9/2009 | Saito |
| 2012/0228400 A1* | 9/2012 | Baron ................... B31F 1/0083 137/15.01 |
| 2015/0209987 A1 | 7/2015 | Nedachi |
| 2016/0059975 A1 | 3/2016 | Michalec |

FOREIGN PATENT DOCUMENTS

| | | |
|---|---|---|
| GB | 2 198 622 A | 6/1988 |
| WO | WO 2015/121815 A1 | 8/2015 |

OTHER PUBLICATIONS

Great Britain reference 2030751; "Whistle Spoon Straw;" Apr. 29, 1993.

* cited by examiner

*Primary Examiner* — Tuongminh N Pham
(74) *Attorney, Agent, or Firm* — Taylor J. Ross (57) ABSTRACT

A drinking straw has an elongated body with a longitudinal flow channel. The user end of the body is closed and rounded for safety. A pair of lateral channels open onto the body adjacent the user end and provide fluid communication to the flow channel. The straw is injection molded, and a mold is provided which accommodates thermal expansion of a rod forming the flow channel. A pair of opposed cavity inserts form the lateral channels. To reduce bending stresses on the rod upon removal of the cavity inserts, one cavity insert is formed longer to the other. This longer cavity insert is removed prior to opening of the mold plates, and as such the straw and rod are supported against bending during this removal.

8 Claims, 10 Drawing Sheets

REUSABLE DRINKING STRAW

CROSS REFERENCE TO RELATED APPLICATIONS

This application is related to Ser. No. 29/700,779, filed Aug. 6, 2019, which is incorporated by reference herein.

STATEMENT REGARDING FEDERALLY SPONSORED RESEARCH

Not applicable.

BACKGROUND OF THE INVENTION

The present invention relates in general to drinking straws for consuming beverages. Typical drinking straws are produced as inexpensively as possible, as they are typically considered disposable. To that end, it is most common to form straws by extrusion of thermoplastic into a tubular stock with straight cut ends. This results in a relatively sharp edge at the longitudinal ends, with this sharp edge posing an injury hazard. US2006/0065757 A1 to Calabrese shows various arrangements to avoid such injury: the end inverted to form an annular curved surface; a separate material deposited about the straw end to form an annular curved surface; a blunt closed end with radial apertures; and an annular rounded edge to the top aperture. While an improvement over cut-end straws, it was felt that further improvement could be made. Beyond the structure of the straw itself, the method of manufacture is equally important. Calabrese indicates several manufacturing process in general, but the details of forming straws of this or similar structure are not disclosed.

SUMMARY OF THE INVENTION

An object of the present invention is to provide a drinking straw having a rounded user end for safety.

Another object of the present invention is to provide such a straw with side apertures to thus reduce sharper edges at the user end.

A further object of the present invention is to provide a straw as above which may be injection molded in a cost-effective manner, and a method of such molding.

Yet another object is to provide a mold for making such a straw which accommodate thermal expansion of its components.

A further object of the present invention is to provide a mold and mold opening sequence which reduces bending stress on mold components.

These and other objects are achieved by a drinking straw according to the present invention.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figures 1, 2:
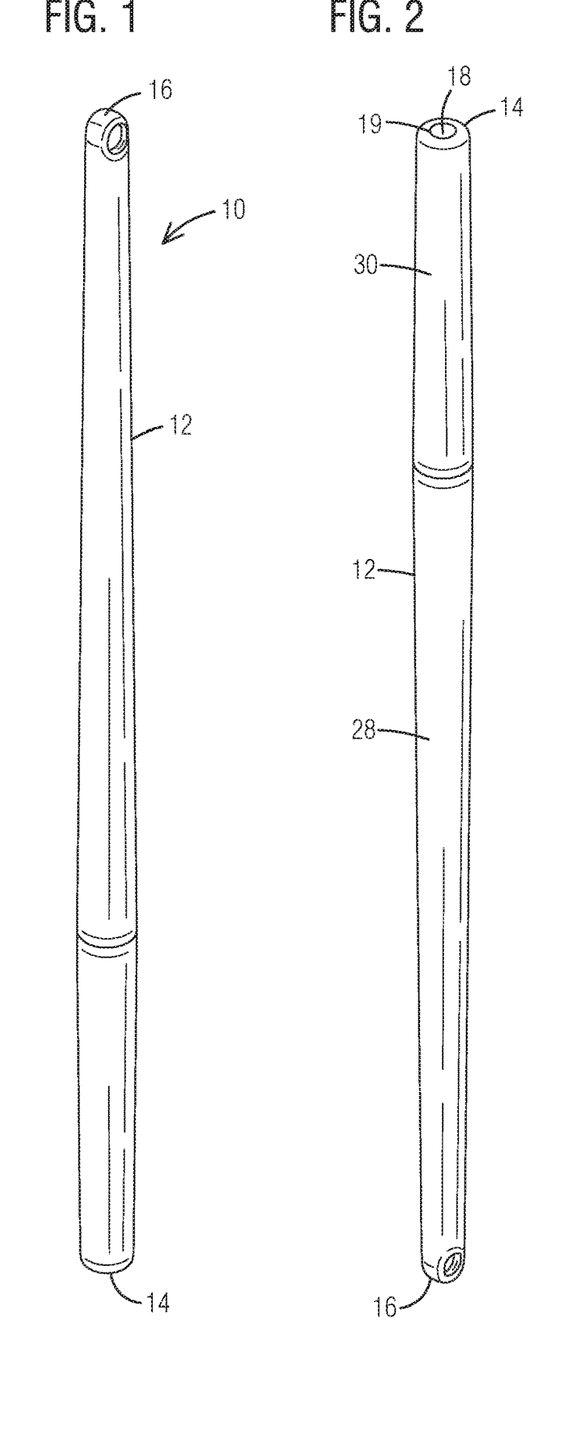
FIG. 1 is a top perspective view of a drinking straw according to the present invention.
FIG. 2 is a bottom perspective view of the straw of FIG. 1.
Figure 3:
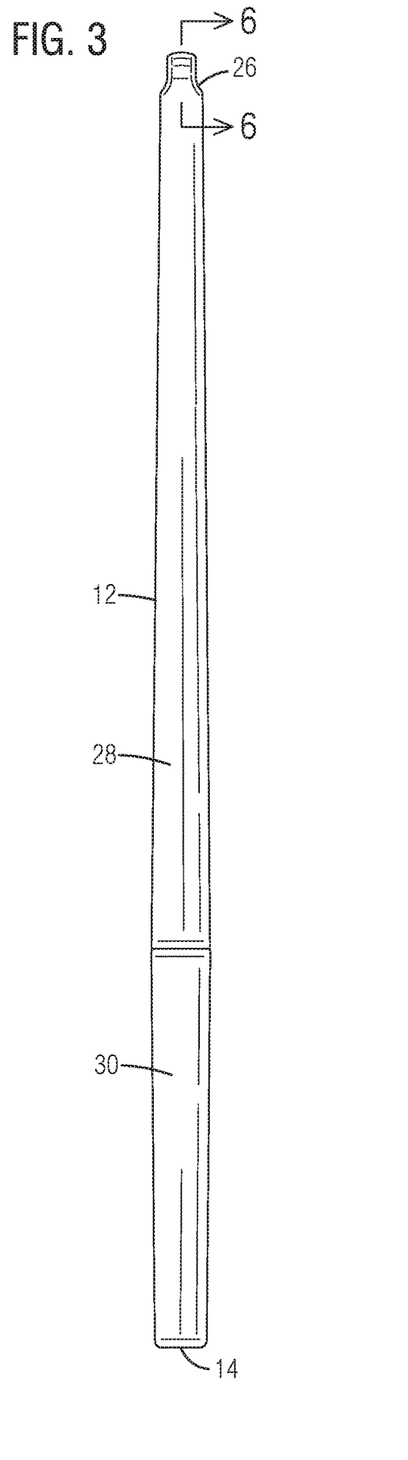
FIG. 3 is a front view of the straw of FIG. 1.
Figure 5:
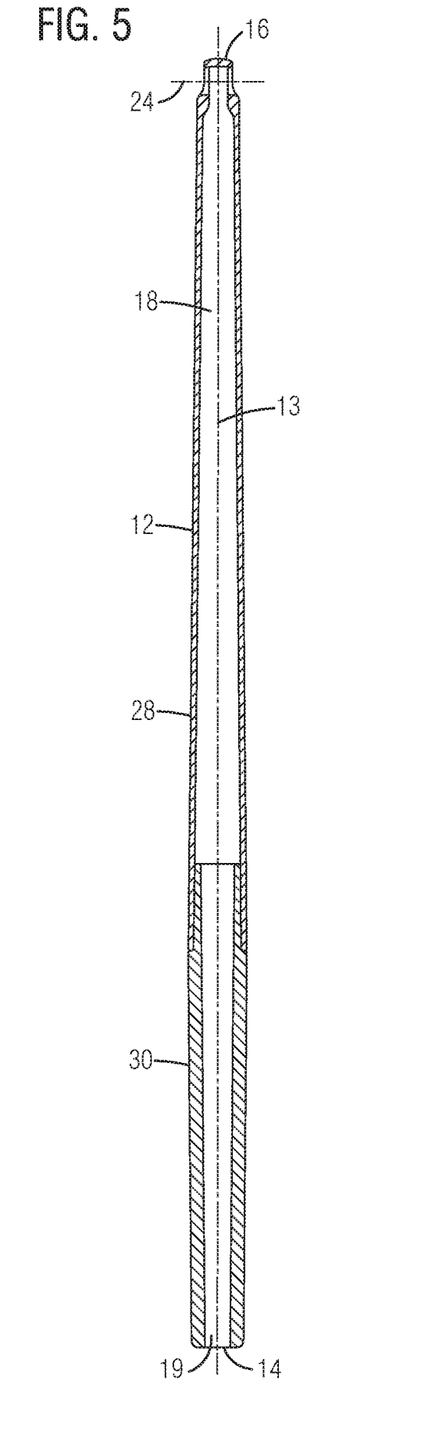
FIG. 5 is a side cross-sectional view along line 5-5 of FIG. 4.

With reference to FIG. 1, a drinking straw according to the present invention is generally designated by reference numeral 10. The drinking straw 10 generally includes a body 12 elongated along a longitudinal axis 13 (FIG. 5), and at the longitudinal extremes an insertion end 14 and a user end 16. The insertion end 14 is intended to be placed within a beverage container below the level of the liquid, and the user end 16 is intended to be held in the mouth of the user. A flow channel 18 extends generally coaxially within the body 12 along the longitudinal axis 13, with the flow channel 18 having a main opening 19 at the insertion end 14 as shown in FIG. 2. With reference to FIG. 5, it may be seen that the flow channel 18 ends near user end 16. To achieve fluid communication to the user, first and second lateral channels 20 and 22, respectively, extend through the body 12 at positions spaced from user end 16, and open onto flow channel 18 as illustrated in FIG. 5. The lateral channels 20 and 22 preferably both extend along a lateral axis 24 normal to the longitudinal axis 13. The spacing of the lateral channels 20 and 22 from the user end 16 may vary as desired, but the spacing must sufficiently small such that the lateral openings 24 would be fully within the mouth upon typical use with the user end 16 held within the user's mouth.

The user end 16 is further formed as rounded and presenting no sharp edges. This rounding is preferably both within the plane defined by the longitudinal and lateral axes 13 and 24 (FIG. 4), and also within a plane normal thereto (FIG. 5). In this manner the user end 16 presents no sharp edges which could injure the mouth of the user by cutting or scraping. For further safety and comfort, it is preferred (but not required) that the lateral channels 20 and 22 both have a rounded transition section 26 (FIG. 7) blending smoothly to the outer surface of body 12.

Figure 4:
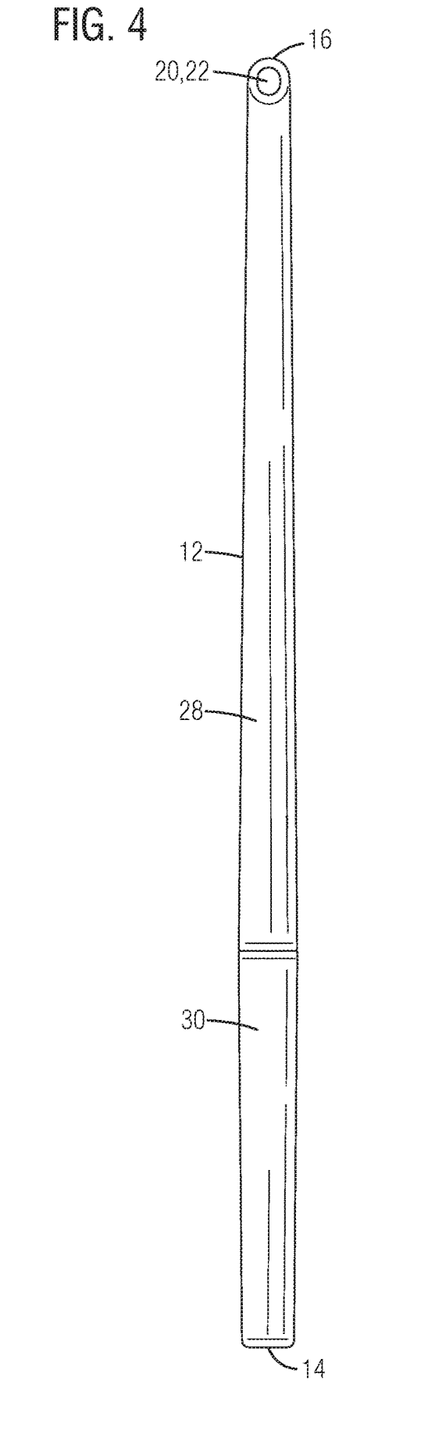
FIG. 4 is a side view of the straw of FIG. 1
Figure 6:
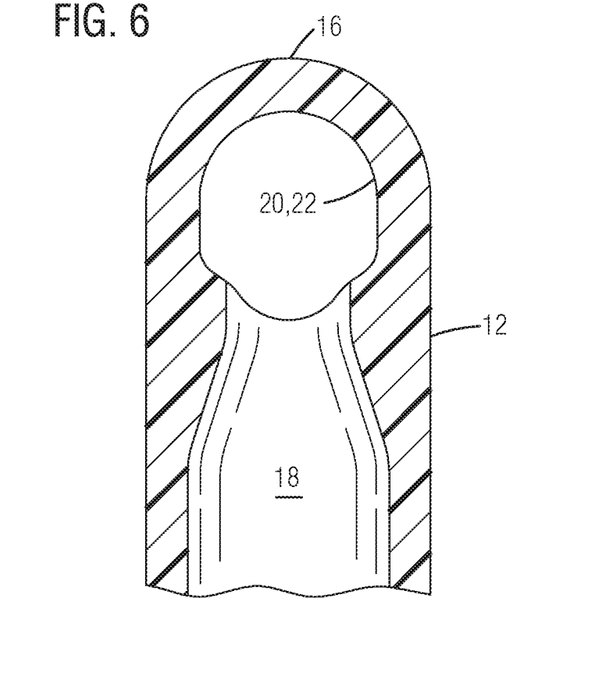
FIG. 6 is a detail front cross-sectional view along line 6-6 of FIG. 3.
Figure 7:
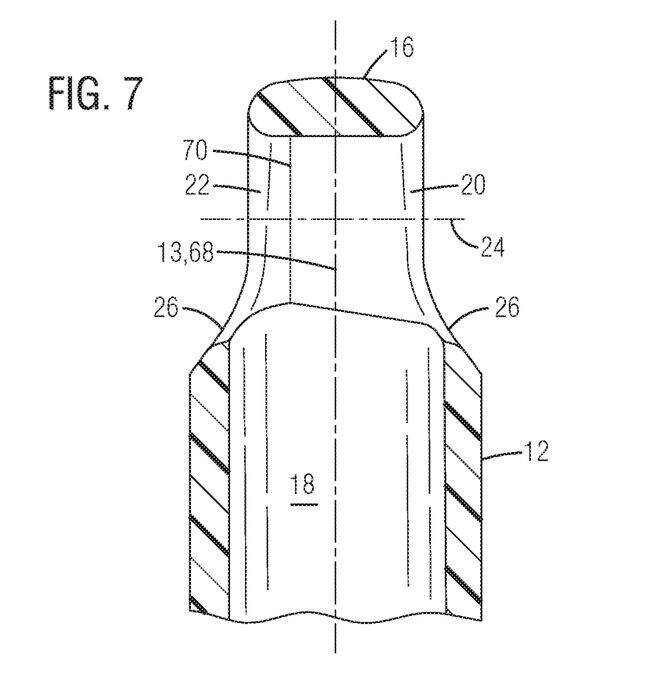
FIG. 7 is a detail view of the user end of FIG. 5.

The lateral channels 20 and 22 may take any cross-sectional (normal to the lateral axis 24) shape desired, and it is possible for these cross-sectional shapes to differ between the first and second channels 20 and 22. For ease of cleaning, it is preferred, however, that the cross-sectional shape of both channels 20 and 22 be circular or oval as shown in FIGS. 4 and 6. The lateral channels 20 and 22 therefore merge to form a continuous smooth channel as illustrated in FIG. 7.

The body 12 may be unitary, but as illustrated in FIGS. 1-5, the body 12 may be segmented into a main body 28 and a body extension 30. The relative lengths of the main body 28 and body extension 30 may be equal or unequal as desired. One advantageous arrangement as shown is to form the main body 28 longer than the body extension 30. This can permit the main body 28 to be used alone for shorter cups or tumblers (not shown), or combined with the body extension 30 for taller cups or tumblers. Further, if the straw is sold in combination with the cup or tumbler, the main body 28 length may be chosen such that the main body 28 (disassembled from the body extension 30) fits well within the associated cup or tumbler for sales packaging or transport, together with loose body extension 30; the body extension 30 would then have a length sufficient such that when combined with the main body 28, the body 12 has a total length as desired to place the user end 16 at the desired distance above the top rim of the associated cup or tumbler for easy use. The main body 28 and body extension 30 may be connected by a coaxial press fit as illustrated in FIG. 5, mating threads (not shown), bayonet (not shown) or other arrangements permitting manual coupling and decoupling. When so combined, the free end of extension 30 would then form the insertion end 14.

The straw 10 as described is believed to have a structure which is an improvement over prior straw designs. But to have a real impact upon reducing waste and improving safety, it is important that the straw 10 be capable of mass production at a very economical scale. While it might be possible to extrude a typical tube; shape the user end to a rounded shape; and form the lateral channels, this would be a multi-step process and relatively expensive. It is therefore a feature of the present invention that the body 12 (or main body 28 if multi-piece) may be made by injection molding in a single shot.

Figures 8, 9:
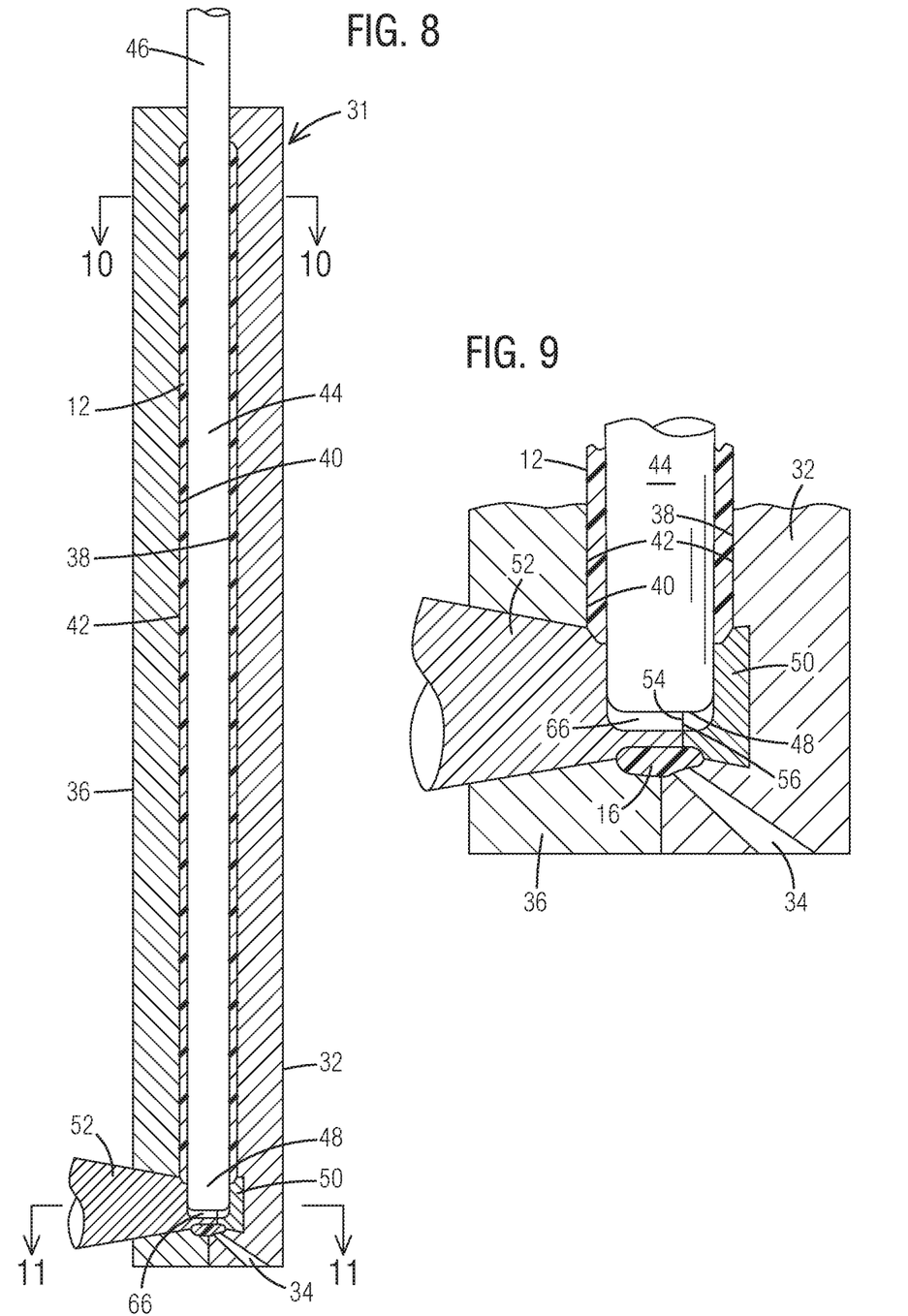
FIG. 8 is a side cross-sectional view of a drinking straw and associated injection mold according to the present invention.
FIG. 9 is a detail view of the user end of FIG. 8.

FIG. 8 illustrates various components for a mold generally identified by reference numeral 31 to form the straw 10. This mold 31 as illustrated is simplified for clarity, with many ancillary components for injection molding not being shown. As is common in injection molding there is a fixed plate 32 having in injection port 34, and a slide plate 36. Both the fixed plate 32 and slide plate 36 each include depressions 38 and 40, respectively, and each is shaped to form half of the outer surface of the straw 10. When the plates 32 and 36 are pressed together in the closed position of FIG. 8 these two depressions 38 and 40 combine to form a cavity 42 corresponding to the final outer shape of the straw 10. It is noted that the straw 10 is shown inverted with the insertion end 14 above the user end 16. The reasons for this will become apparent with further discussion.

Figure 10:
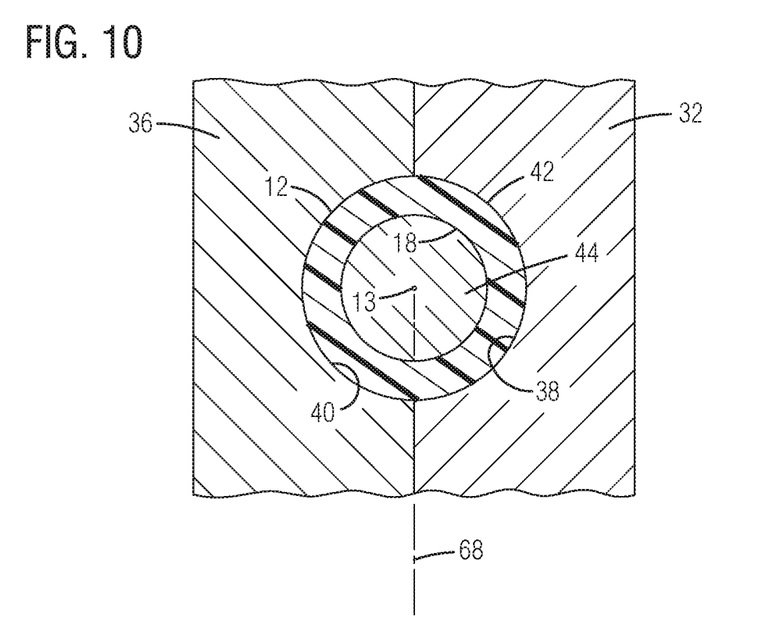
FIG. 10 is a cross-sectional view along line 10-10 of FIG. 8.

The cavity 42 will define the outer surface of the straw 10, and as such has an elongated cylindrical shape aligned about with the longitudinal axis 13, as illustrated in FIG. 10. The straw 10 further include an inner surface defining the flow channel 18. To form this flow channel 18, the mold 31 further includes a rod 44 extending coaxial to the cavity 42. For a typical straw with opposed end holes, the rod 44 could extend fully through the cavity 42. For straw 10, however, the user end 16 is closed at the longitudinal axis, and as such the rod 44 stops short of the lower end of cavity 42. As such, a mold end 46 of rod 44 is connected to the mold 31, while a free end 48 of rod 44 is unconnected, and spaced slightly from the lower end of cavity 42, which will define the user end 16.

It must be recognized that the rod 44 is very thin compared to its length. For a typical straw, the length of rod 44 would be around 200 mm, while the diameter would be about 9 mm. This results in two factors which must be addressed to mold the straw 10: thermal expansion of the rod along the longitudinal axis; and the potential for bending the rod 44 with lateral forces resulting in deformation. The molding arrangement according to the present invention addresses both factors, as will become apparent below.

While cavity 42 and rod 44 cooperate to form the majority of the straw 10, the first and second lateral channels 20 and 22 must also be formed, and in a manner to communicate with the flow channel 18. These first and second lateral channels 20 and 22 are formed by first and second cavity inserts 50 and 52. The first cavity insert 50 is secured to the fixed plate 32 so as to extend cantilevered into cavity 42 along lateral axis 24, to terminate in a first insert end 54. Similarly, the second cavity insert 52 is associated with slide plate 36 so as to extend cantilevered into cavity 42 along lateral axis 24, to terminate in a second insert end 56.

Both the first and second cavity inserts 50 and 52 must fit closely against the free end 48 of rod 44 to ensure the lateral channels 20 and 22 are formed in communication with the flow channel 18. It is possible for the rod 44 to remain a constant diameter (with draft angle as noted below), and for the insert ends 54 and 56 to include mating curvature so as to abut purely against the lateral sides of the rod 44. As noted above, however, the geometry of rod 44 results in appreciable thermal expansion along the longitudinal axis 13. This will result in the free end 48 misaligning longitudinally with the cavity inserts 50 and 52 before thermal expansion, after thermal expansion, or both. This in turn results in the molded straw 10 having either a projection (not shown) extending between and partially blocking the first and second lateral channels 20, 22 when the rod 44 is less-than fully-expanded, or when the rod is fully expanded forming a depression (not shown) between the first and second lateral channels (toward the free end 16) which can trap food and be difficult to clean. Either result is preferably avoided.

Figure 11:
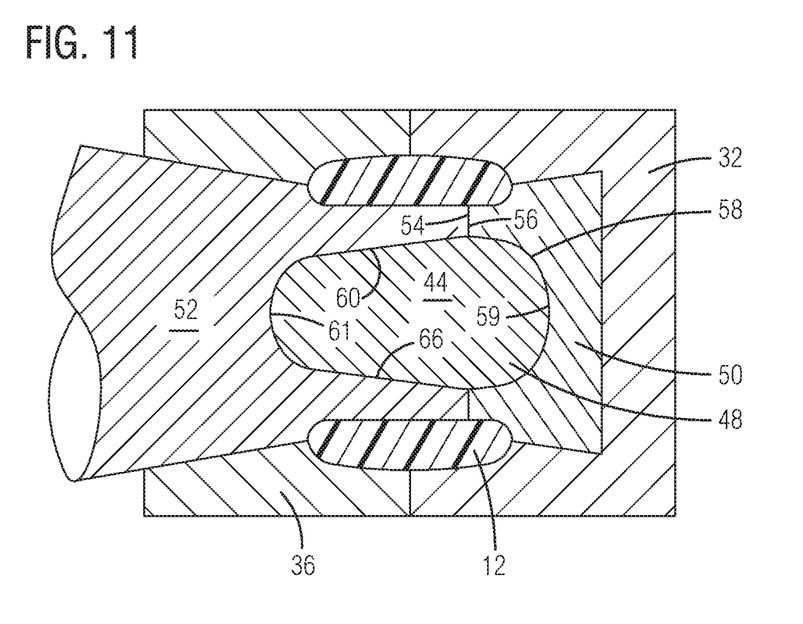
FIG. 11 is a cross-sectional view along line 11-11 of FIG. 8.
Figure 12:
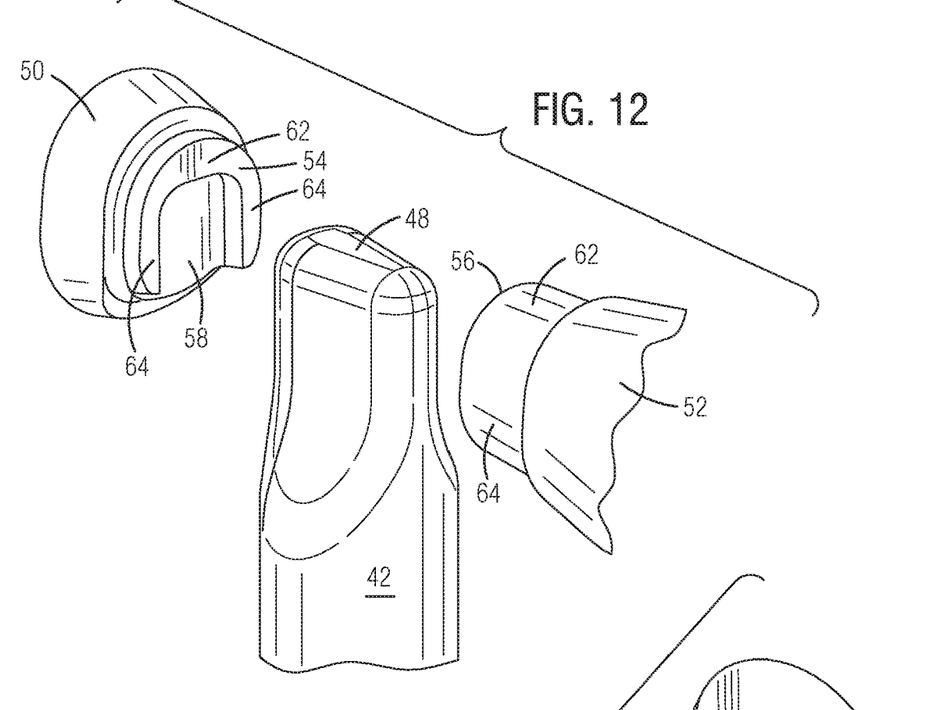
FIG. 12 is a bottom right perspective view of select mold elements.
Figure 13:
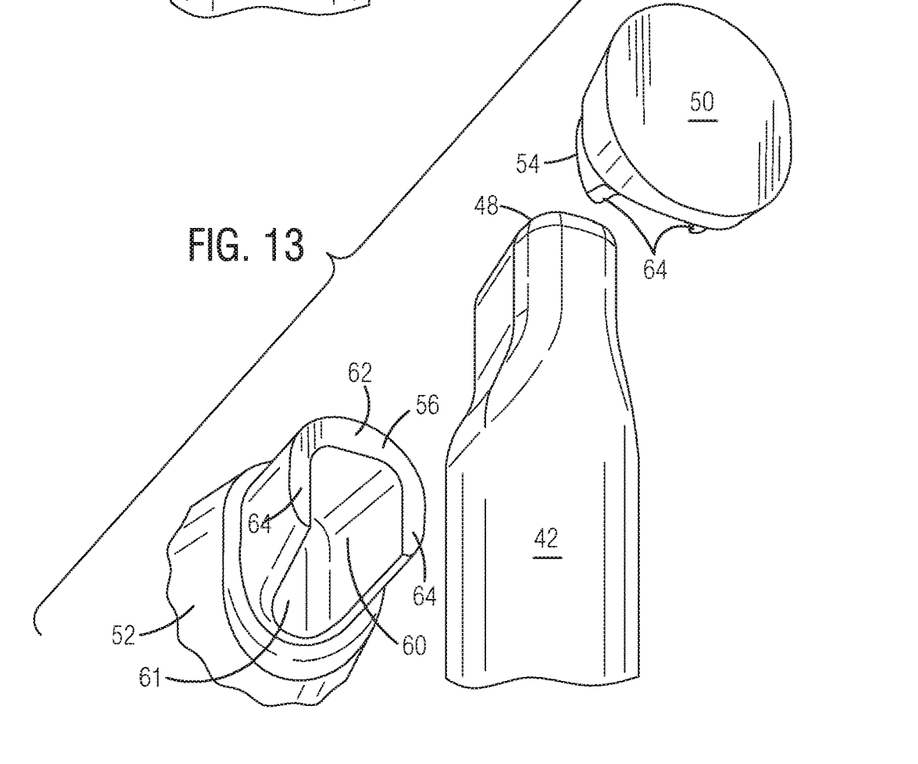
FIG. 13 is a top left perspective of the mold elements of FIG. 12.
Figure 14:
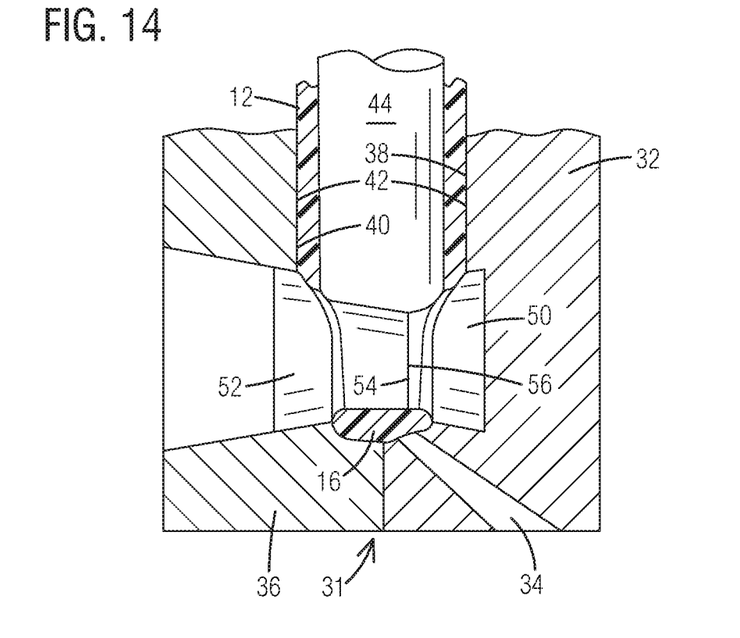
FIGS. 14-18 are partial side cross-sectional views of a straw and associated mold of FIG. 8 in the various steps of the mold opening sequence.

To accommodate the thermal expansion of rod 44 yet have consistently molded lateral channels 20 and 22, it is preferred to form each of the first and second cavity inserts 50 and 54 with a saddle or U shape adjacent the insert ends 54 and 56, as best illustrated in FIGS. 12 and 13 (with plates 32 and 36 not shown, for clarity). In this arrangement, the first and second cavity inserts 50 and 52 have lengths sufficient to form the entirety of the combined first and second lateral channels 20 and 22, and in fact the first insert end 54 will abut the second insert end 56 when mold 31 is fully closed for forming the straw 10, as illustrated in FIG. 11. Formed within first cavity insert 50 is a first rod notch 58 extending inward along the lateral axis 24 from first insert end 54 to a first back wall 59. Similarly, formed within second cavity insert 52 is a second rod notch 60 extending inward along the lateral axis 24 from second insert end 56 to a second back wall 61. Each of the first and second rod notches 58 and 60 are closed in the direction toward the user end 16, and open in the direction away from user end 16 as well as opening inward along lateral axis 24. In this manner, the first and second insert ends 54 and 56 will take the saddle or U-shaped form surrounding the notches 58 and 60, with each such saddle or U-shape including a cross bar 62 with two legs 64, one leg 64 extending from each end of the associated cross bar 62.

As noted, when the mold 31 is in the fully closed position (FIGS. 8-11 and 14) the first and second insert ends 54 and 56 will abut. For ease of manufacture and maintenance, it is preferred that the insert ends 54 and 56 have flat faces, but other more complex configurations could be possible. When insert ends 54 and 56 are in abutment, the notches 58 and 60 will combine to form a rod cavity 66 (best shown in FIG. 11) which, as with the notches, is closed toward the user end 16 but open away from the user end 16. The portion of rod cavity 66 formed by the legs 64 and back walls 59 and 61 will closely abut against and very closely receive the lateral sides of rod 44 which are laterally opposed to the respective cavity insert 50 or 52. As noted, the insert ends 54 and 56 will also abut against each other at the cross bar 62 and legs 64. In this manner, when the cavity inserts 50 and 52 are closed upon the rod 44, they together form a T-shaped structure to properly form the flow channel 18 and lateral channels 20 and 22.

As noted above, this use of notches 58 and 60 forming the saddle or U-shape will address the problem of longitudinal thermal expansion in rod 44. This is achieved by properly sizing the length of rod 44, and the longitudinal depth of the rod notches 58 and 60 (and thus the rod cavity 66. With reference to FIG. 9, rod 44 and rod cavity 66 are arranged such that the free end 48 of rod 44 will be received within rod cavity at room temperatures (unexpanded), but the remaining empty depth of rod cavity 66 just exceeds the anticipated longitudinal thermal expansion of rod 44. As such, the rod 44 may expand during use but all changes in its longitudinal dimension will be within the rod cavity 66, with no changes of the T-shaped structure formed by rod 44 and cavity inserts 50 and 52. Put another way, the free end 48 is free to move toward or away from the closed end of rod cavity 66 (or alternatively, toward or away from the user end 16) similar to a piston in a cylinder, while keeping the outside T-shaped geometry stable.

With this arrangement, it is clear that the thickness of the legs 64 will add to the thickness of the free end 48, which would in turn increase the diameter of the straw adjacent the user end 16, creating a bulbous portion at the user end 16 (not shown). This is considered aesthetically unpleasing. One solution would be to proportionally increase the diameter of body 12 along its entire length to create a sleek aesthetic, but this would result in additional material being used. This increases cost, weight and plastic waste.

The preferred solution is to reduce the thickness of rod 44 to accommodate the thickness of legs 64. As shown in in FIGS. 12 and 13 the free end 48 of rod 44 may include a reduced thickness in the direction normal to both the longitudinal axis 13 and lateral axis 24, and for a length at least corresponding to the length of the legs 64. In this manner the cavity inserts 50 and 52 may form the lateral channels 20, 22 without increasing the diameter of the body 12. This is best illustrated in FIG. 6, where the flow channel 18 tapers inward toward the user end 16 leading in to the lateral channels 20, 22. The reduced thickness section of the rod 44 could begin closer to the free end 48 to reduce the amount of taper, as desired. It is noted that even with this reduced thickness, the notches 58 and 60 can accommodate the longitudinal thermal expansion of the rod 44.

With the longitudinal thermal expansion of rod 44 addressed, the remaining factor which must be addressed to mold the straw 10 is the potential for bending the rod 44 with lateral forces resulting in deformation. This is best described with reference to the molding process. FIGS. 8-11 illustrate the mold 31 for forming the straw 10. FIG. 8 in particular illustrates all the elements of mold 31 in the closed position and after injecting the plastic to form straw 10. In this closed position the rod 44 is held in position at the mold end 46 (preferably the uppermost end) by the mold 31, and held in position at the free end 48 by the abutting cavity inserts 50 and 52, and more specifically the rod cavity 66. The rod 44 is quite secure in this closed position. The problem arises when the mold 31 is opened.

As is well known in the art, there is a certain amount of friction or drag between the walls of the mold cavity (such as cavity 42) and the newly-molded part (such as straw 10) upon opening the mold. To accommodate this, mold elements are formed with draft angles to reduce contact, and thus drag, during mold separation. For straw 10, FIG. 10 illustrates that a main parting line 68 is defined by the plane between the fixed plate 32 and slide plate 36, and the longitudinal axis 13 is within this plane of main parting line 68. The cross-sectional shape of the body 12 may be chosen to minimize drag during opening of the mold 31, such as the circular cross-sectional shape preferred and shown. With such an arrangement the body 12 will separate with a minimal amount of drag, and thus potential bending forces, to prevent deformation of rod 44.

However, the mold 31 also includes the cavity inserts 50 and 52 which must be removed from the newly-molded straw 10. These cavity inserts 50 and 52 extend laterally into the straw 10 across its entire width, such that they may create higher drag than the plates 32 or 36. Further, this higher drag is located at the free end 48 of rod 44, creating the highest torque comparatively along the length of rod 44. Just as with the plates 32 and 36, the insert ends 54 and 56 abut each other along a plane and form an insert parting line 70. Simply forming cavity inserts 50 and 52 of equal length (such that parting lines 68 and 70 coincide) and fixing the cavity inserts to their respective plates could cause sufficient drag to bend the rod 44 upon mold opening.

To reduce this risk, the first cavity insert 50 (secured to, or a monolithic part of, the fixed plate 32 is formed with a length less than that of the second cavity insert 52 (associated with the slide plate 36). This will result in the insert parting line 70 being offset from the main parting line 68. More importantly, the difference in length will also result in a corresponding difference in drag created as the cavity inserts 50 and 52 are withdrawn from the newly-molded straw 10. Specifically, the shorter cavity insert 50 will exert less drag (and perhaps considerably less) than the longer cavity insert 52 during withdrawal.

This higher drag of second cavity insert 52 would of course create even higher bending forces on rod 44 compared to equal-length cavity inserts. While this would normally be avoided, in the present invention the second cavity insert 52 is associated with, but not fixed to, the slide plate 36. Specifically, the mold 31 is formed with the second cavity insert 52 capable of sliding (reciprocation) with respect to the slide plate 36. This allows an opportunity to actually reduce the bending forces on rod 44 due to the cavity inserts 50 and 52.

This is best illustrated in FIGS. 14-18 which illustrate the unique opening sequence of mold 31. In these figures the mold plates 32 and 34, and the body 12, are shown in cross-section, while the cavity inserts 50 and 52, as well as rod 44, are shown without cross-section, for clarity. For each molding cycle, the mold 31 is closed and thermoplastic is injected into cavity 42 through one or more injection ports. Upon sufficient cooling, the thermoplastic solidifies in the shape of cavity 42 to form the newly-molded straw 10. In this configuration the body 12 as well as cavity inserts 50 and 52 serve to support the rod 44 against bending.

Figure 15:
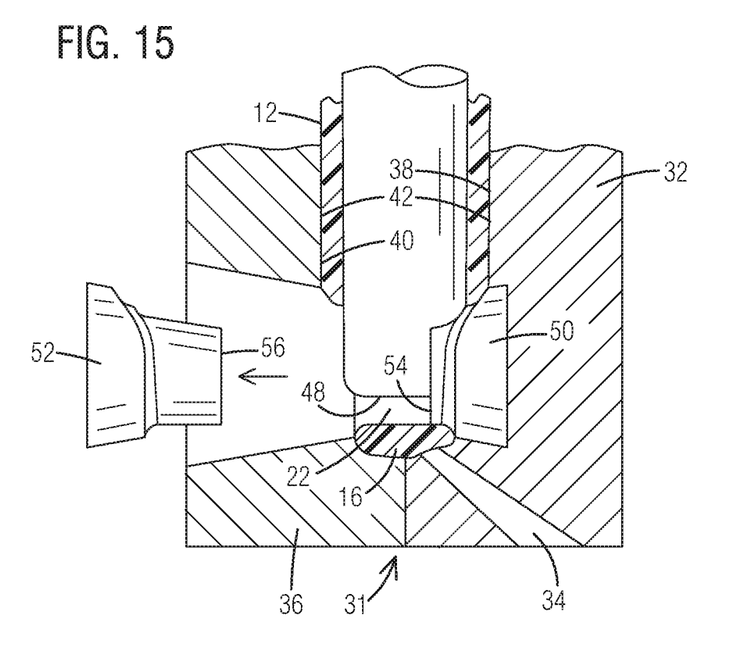
Figure 16:
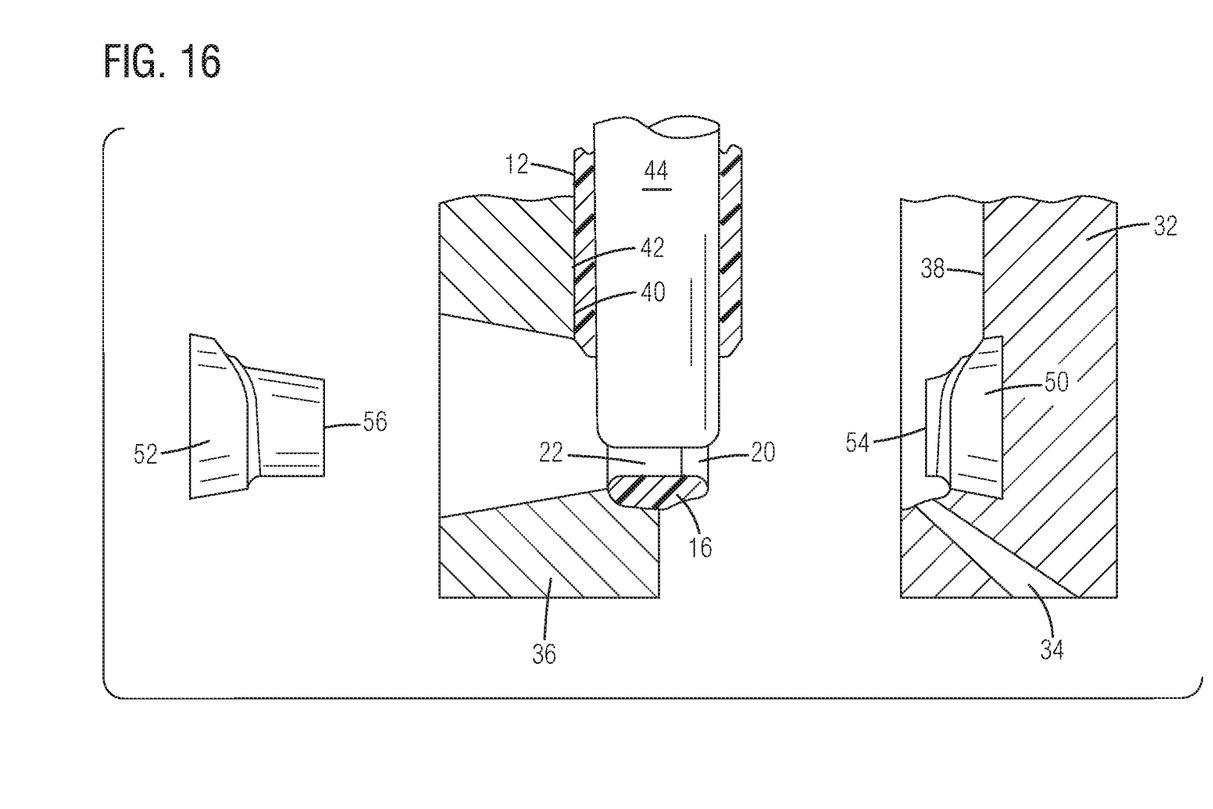

As shown in FIG. 15, the first step in the opening sequence is to move the second cavity insert 52 outward along its lateral axis 24 to fully withdraw it from the body 12. As noted above, this second cavity insert 52 is formed longer than insert 50, and thus creates more drag upon removal. As may be seen, this removal of second cavity insert 52 is performed while the slide plate 36 is still closed against the fixed plate 32. In this manner, the slide pate depression 40 in slide plate 36 supports the body 12 and thus rod 44 against movement and thus deformation.

The next step in the opening sequence is to move the slide 36 to its open position with rod 44 remaining in position relative to slide plate 36. During this opening of slide plate 32, the second cavity insert 52 will also remain in its already opened position relative to slide plate 36. Alternatively, the second cavity insert could be withdrawn a sufficient distance during its opening step that no further movement of the second cavity insert is needed; the important consideration is that the second cavity insert remain outside the body 12 even upon slide plate 36 reaching its fully open position. During this step the body 12 is moved out of the fixed plate depression 38 and first cavity insert 50 is also withdrawn from the body 12. As noted, this will result in drag, and thus some bending force on rod 44. However, the reduced length for first insert 50 will as noted, result in reduced bending forces on rod 44.

Figure 17:
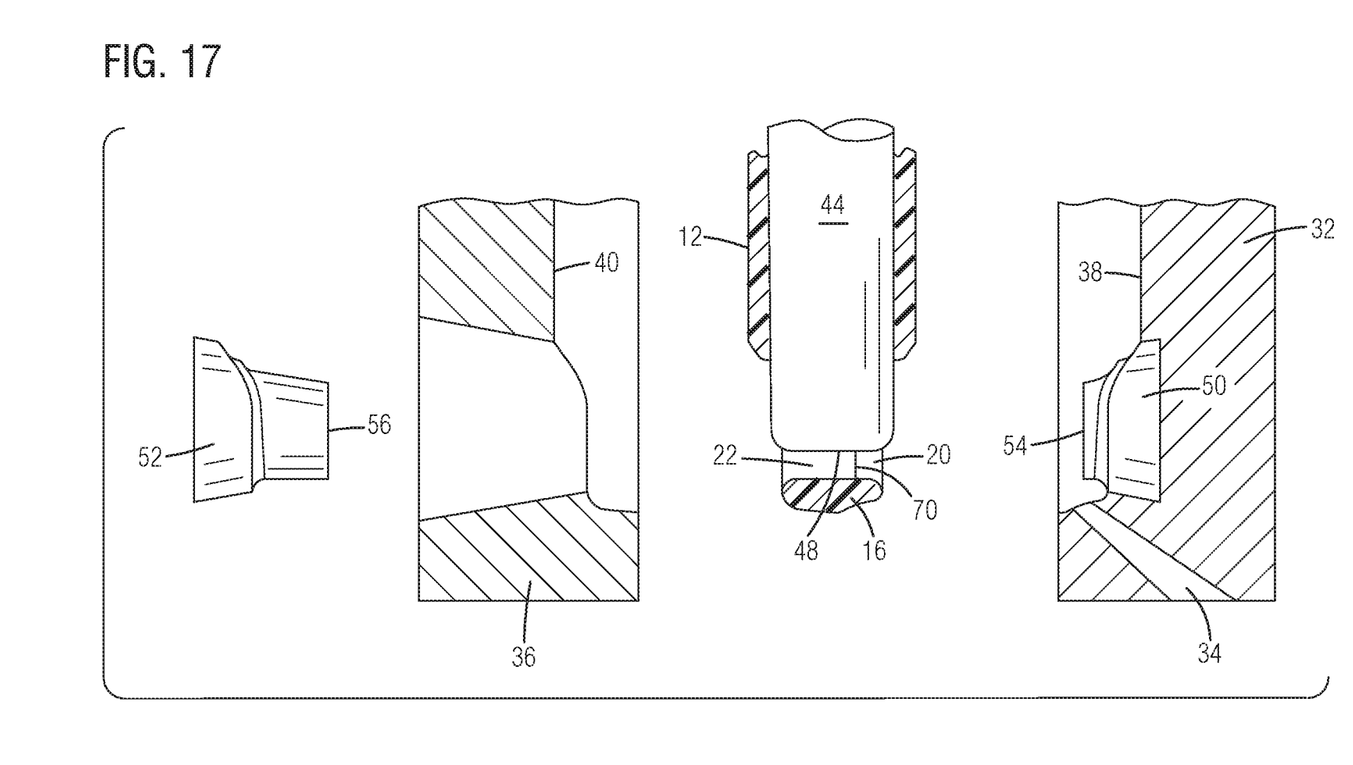
Figure 18:
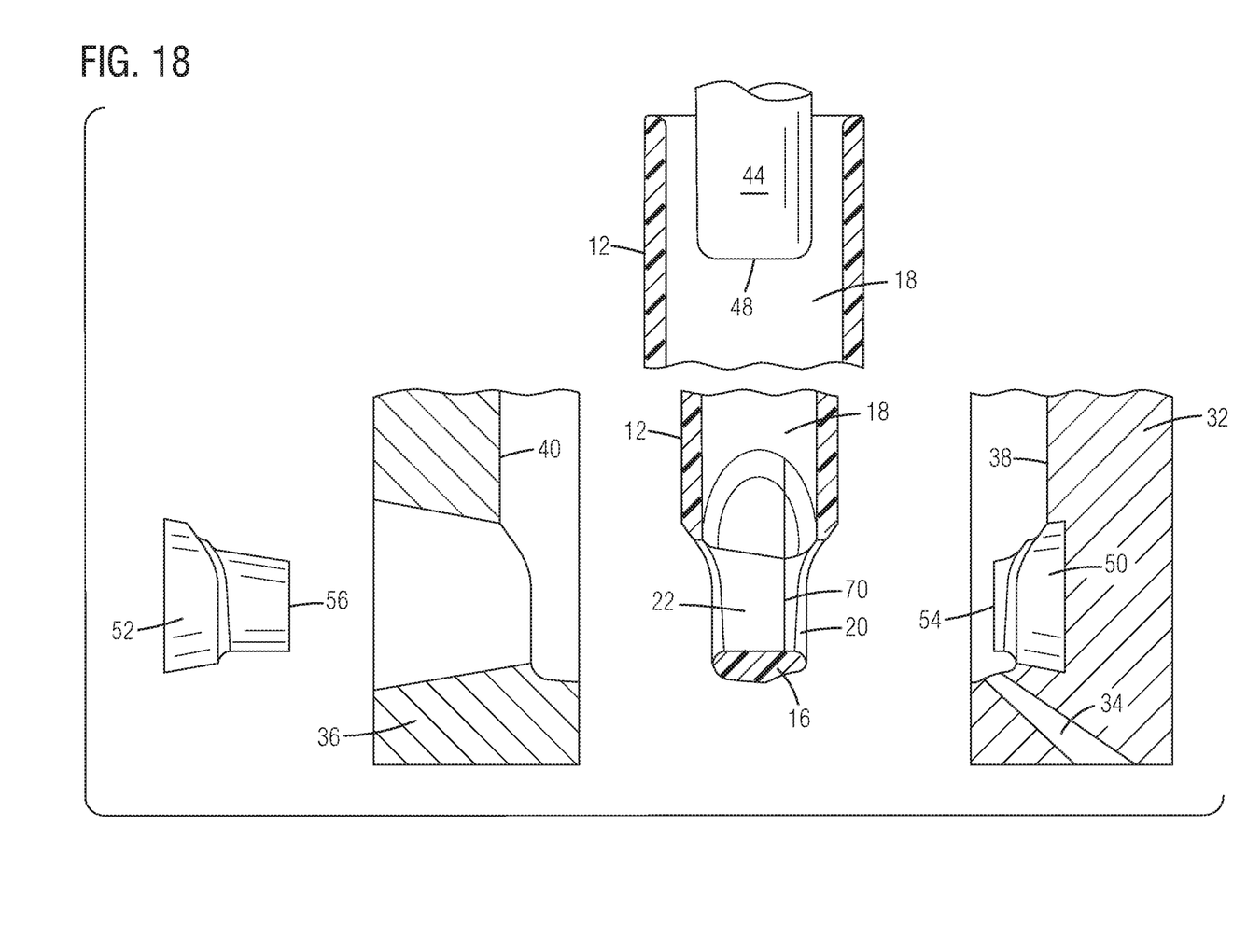

In the next step, shown in FIG. 17, slide plate 36 and rod 44 move away from each other to move the body 12 out of the slide plate depression 40. This relative movement may be due to rod 44 remaining fixed while slide plate 32 continues to move outward; the slide plate 32 remaining fixed in its open position while rod 44 moves toward fixed plate 32; or a combination of both. At this point, the body 12 is supported only by the rod 44. The final step in the opening sequence for mold 31 is to eject the newly-molded straw 10 off of rod 44, as illustrated in FIG. 18. As may be seen, the rod 44 has an appropriate draft angle to not imped in ejecting the straw 10. Additionally, it may be seen that molding the straw 10 with the user end 16 lowermost allows gravity to assist in the ejection of the straw 10. At this point, the mold 31 is clear, and the steps above are reversed to bring all components of mold 31 back into the closed position, forming cavity 42 once again, ready for the next shot.

As may be seen, the present invention provides a drinking straw 10 having improved safety due to its closed rounded user end 16, with this closed end made possible by opposed lateral channels 20 and 22 communicating with flow channel 18. The manufacture of such a straw 10 presents some challenges which the present invention overcomes by allowing thermal expansion of rod 44 within rod cavity 66, as well as by forming the cavity inserts 50, 52 of differing lengths and using an opening sequence for mold 31 which withdraws the longer second cavity insert 52 prior to opening the fixed and sliding plates 32 and 36 to thus support the rod 44.

While the present invention has been described with the straw having a cylindrical shape, with cylindrical flow channel, it will be apparent to those in the art that different geometric configurations; such as square, hexagonal, octagonal, etc. (not shown) could be employed for both so long as undercuts do not prevent molding. Further, the first cavity insert 50 could be associated with fixed plate 32 in a manner similar to second cavity insert 52 and slide plate 36; specifically, the first cavity insert could be movable with respect to fixed plate 32. This would allow withdrawal of both cavity inserts 50 and 52 from body 12 while the plates 32 and 36 remain closed and supporting rod 44 (similar to FIG. 15). While this arrangement would allow cavity inserts of equal length, this arrangement is not preferred as forming a sliding first cavity insert on the fixed plate 32 significantly complicates construction of mold 31.

From the foregoing it will be seen that this invention is one well adapted to attain all ends and objects set forth above together with the other advantages which are inherent within its structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth of shown in the accompanying drawings is to be interpreted as illustrative, and not in a limiting sense.

What is claimed is:

1. A drinking straw, comprising:
   a body elongated along a longitudinal axis, having a first width and ending at an insertion end and a user end;
   a flow channel extending though said body along said longitudinal axis, said flow channel having a main opening extending through said insertion end, and ending short of said user end; and
   opposingly oriented first and second lateral channels extend through said body adjacent said user end and merge to form a continuous channel through the user end and are each in fluid communication with said flow channel;
   wherein said user end terminates with a rounded arcuate closed end that has a second width that is smaller than the first width, and
   wherein said straw is formed by injection molding and, in a side cross-sectional view of the user end, the interior surface of the continuous channel has an insert parting line formed where first and second cavity inserts mate during injection molding, which is offset from a main parting line formed on the exterior of the body where first and second plates mate during injection molding.

2. A drinking straw as in claim 1, wherein said first and second lateral channels have rounded edges and are free of a projection extending away from said user end or a depression extending toward said user end.

3. A drinking straw as in claim 1, wherein said first and second lateral channels extend along a common lateral axis.

4. A drinking straw as in claim 1, wherein the flow channel tapers inward toward the longitudinal axis leading in to the first and second lateral channels at the user end.

5. A drinking straw as in claim 1, wherein the first and second lateral channels each have a cross-sectional shape that is circular or oval.

6. A drinking straw as in claim 1, wherein an opening of each of the first and second lateral channels, in a side cross-sectional view of the user end, have a rounded transition that is concavely shaped and blending smoothly to the outer surface of the body.

7. A drinking straw as in claim 1, wherein the body is segmented into a main body that includes the user end and an insertion end and a body extension that defines a secondary insertion end that are mateable together.

8. A drinking straw as in claim 7, wherein the main body and the body extension are mateable by a coaxial press fit of a male end to a female end, wherein either of the main body or the body extension defines the male end.

* * * * *